US011727329B2

(12) United States Patent
Nikolaev et al.

(10) Patent No.: US 11,727,329 B2
(45) Date of Patent: Aug. 15, 2023

(54) METHOD AND SYSTEM FOR RECEIVING LABEL FOR DIGITAL TASK EXECUTED WITHIN CROWD-SOURCED ENVIRONMENT

(71) Applicant: YANDEX EUROPE AG, Lucerne (CH)

(72) Inventors: Kirill Valerievich Nikolaev, Tula (RU); Aleksandr Sergeevich Lukyanov, Moscow (RU); Rishat Narimanovich Ibragimov, Kazan (RU); Dmitry Nikolaevich Veltishchev, Moscow (RU); Nikita Romanovich Popov, Lyubertsy (RU); Vladislav Viktorovich Nemiro, Sochi (RU); Darya Sergeevna Zvereva, Orsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 17/165,406

(22) Filed: Feb. 2, 2021

(65) Prior Publication Data

US 2021/0256454 A1   Aug. 19, 2021

(30) Foreign Application Priority Data

Feb. 14, 2020   (RU) .......................... RU2020107002

(51) Int. Cl.
*G06Q 10/0631* (2023.01)
*G06N 20/00* (2019.01)
(Continued)

(52) U.S. Cl.
CPC ... *G06Q 10/063112* (2013.01); *G06F 16/285* (2019.01); *G06F 16/9538* (2019.01); *G06N 20/00* (2019.01)

(58) Field of Classification Search
CPC .................................................... G06F 16/285
(Continued)

(56) References Cited

U.S. PATENT DOCUMENTS 6,560,597 B1   5/2003 Dhillon et al.
7,366,705 B2   4/2008 Zeng et al.
(Continued)

FOREIGN PATENT DOCUMENTS

CN   103914478 A   7/2014
CN   104463424 A   3/2015
(Continued)

OTHER PUBLICATIONS

Hettiachchi, A Survey on Task Assignment in Crowdsourcing, Nov. 15, 2021, https://arxiv.org/pdf/2111.08501.pdf, p. 1-36.*
(Continued)

*Primary Examiner* — Mehmet Yesildag
*Assistant Examiner* — James Webb
(74) *Attorney, Agent, or Firm* — BCF LLP

(57) ABSTRACT

There is disclosed a method and system for receiving a label for a digital task executed within a computer-implemented crowd-sourced environment, the method comprising: receiving, an indication of the digital task to be processed in the computer-implemented crowd-sourced environment; generating, a subset of examples, the subset of examples based on past digital tasks executed in the computer-implemented crowd-sourced environment, each of the subset of examples being similar to the digital task within a pre-determined similarity threshold; the subset of examples having a number of examples selected such that to provide maximum benchmark coverage with a minimum number of samples in the subset of examples; associating, the subset of examples to the digital task to be presented; causing the digital task to be presented on a computing device of at least
(Continued)

one crowd-sourced worker in the computer-implemented crowd-sourced environment to solicit the label for the digital task.

8 Claims, 6 Drawing Sheets

(51) Int. Cl.
  *G06F 16/9538* (2019.01)
  *G06F 16/28* (2019.01)
(58) Field of Classification Search
  USPC .......................................................... 707/737
  See application file for complete search history.

(56) References Cited

U.S. PATENT DOCUMENTS

| | | |
|---|---|---|
| 7,693,738 B2 | 4/2010 | Guinta et al. |
| 7,747,083 B2 | 6/2010 | Tawde et al. |
| 8,266,130 B2 | 9/2012 | Jones et al. |
| 8,498,892 B1 | 7/2013 | Cohen et al. |
| 8,554,605 B2 | 10/2013 | Oleson et al. |
| 8,626,545 B2 | 1/2014 | Van et al. |
| 9,268,766 B2 | 2/2016 | Bekkerman |
| 9,330,071 B1 | 5/2016 | Ahmed et al. |
| 9,584,540 B1 | 2/2017 | Chan et al. |
| 9,594,944 B2 | 3/2017 | Kompalli et al. |
| 9,767,419 B2 | 9/2017 | Venanzi et al. |
| 9,911,088 B2 | 3/2018 | Nath et al. |
| 10,061,848 B2 | 8/2018 | Basu et al. |
| 10,095,688 B2 | 10/2018 | Schilling et al. |
| 10,162,734 B1 | 12/2018 | Podgorny et al. |
| 10,445,671 B2 | 10/2019 | Dubey et al. |
| 10,685,329 B2 | 6/2020 | Taylor et al. |
| 10,978,056 B1 | 4/2021 | Challa et al. |
| 2002/0032591 A1 | 3/2002 | Mahaffy et al. |
| 2003/0154181 A1 | 8/2003 | Liu et al. |
| 2006/0026240 A1* | 2/2006 | Anthony ............... G06Q 30/02 709/206 |
| 2007/0226207 A1 | 9/2007 | Tawde |
| 2007/0260601 A1 | 11/2007 | Thompson et al. |
| 2008/0027913 A1 | 1/2008 | Chang et al. |
| 2009/0204470 A1 | 8/2009 | Weyl et al. |
| 2010/0153156 A1 | 6/2010 | Guinta et al. |
| 2010/0293026 A1 | 11/2010 | Vojnovic et al. |
| 2011/0173183 A1 | 7/2011 | Dasdan et al. |
| 2011/0313801 A1 | 12/2011 | Biewald et al. |
| 2012/0005131 A1 | 1/2012 | Horvitz et al. |
| 2012/0131572 A1 | 5/2012 | Shae et al. |
| 2012/0150579 A1 | 6/2012 | De Wit et al. |
| 2012/0265573 A1 | 10/2012 | Van et al. |
| 2013/0006717 A1 | 1/2013 | Oleson et al. |
| 2013/0029769 A1 | 1/2013 | Lee et al. |
| 2013/0096968 A1 | 4/2013 | Van Pelt et al. |
| 2013/0111488 A1 | 5/2013 | Gatti et al. |
| 2013/0132080 A1 | 5/2013 | Williams et al. |
| 2013/0159292 A1 | 6/2013 | Larlus et al. |
| 2013/0231969 A1 | 9/2013 | Van et al. |
| 2014/0122188 A1 | 5/2014 | Van Pelt et al. |
| 2014/0172767 A1 | 6/2014 | Chen et al. |
| 2014/0229413 A1 | 8/2014 | Dasgupta et al. |
| 2014/0278634 A1 | 9/2014 | Horvitz et al. |
| 2014/0343984 A1 | 11/2014 | Shahabi et al. |
| 2014/0355835 A1 | 12/2014 | Rodriguez-Serrano et al. |
| 2015/0004465 A1 | 2/2015 | Basu et al. |
| 2015/0074033 A1 | 3/2015 | Shah et al. |
| 2015/0086072 A1 | 3/2015 | Kompalli et al. |
| 2015/0178659 A1 | 6/2015 | Dai et al. |
| 2015/0213392 A1 | 7/2015 | Kittur et al. |
| 2015/0254593 A1 | 9/2015 | Ramos et al. |
| 2015/0254596 A1 | 9/2015 | Nayar et al. |
| 2015/0254785 A1 | 9/2015 | Yang et al. |
| 2015/0262111 A1 | 9/2015 | Yu et al. |
| 2015/0317582 A1 | 11/2015 | Nath et al. |
| 2015/0347519 A1 | 12/2015 | Hornkvist et al. |
| 2015/0356488 A1 | 12/2015 | Eden et al. |
| 2015/0356489 A1 | 12/2015 | Kazai et al. |
| 2015/0363741 A1 | 12/2015 | Chandra et al. |
| 2016/0041849 A1 | 2/2016 | Naveh et al. |
| 2016/0100000 A1 | 4/2016 | Dey et al. |
| 2016/0132815 A1 | 5/2016 | Itoko et al. |
| 2016/0140477 A1 | 5/2016 | Karanam et al. |
| 2016/0210570 A1 | 7/2016 | Lee et al. |
| 2016/0232221 A1 | 8/2016 | McCloskey et al. |
| 2016/0035785 A1 | 12/2016 | Fan et al. |
| 2017/0011077 A1 | 1/2017 | Kypreos et al. |
| 2017/0024931 A1 | 1/2017 | Sheffer et al. |
| 2017/0046794 A1 | 2/2017 | Shukla et al. |
| 2017/0052761 A1 | 2/2017 | Gunshor et al. |
| 2017/0061341 A1 | 3/2017 | Haas et al. |
| 2017/0061356 A1 | 3/2017 | Haas et al. |
| 2017/0061357 A1 | 3/2017 | Dubey et al. |
| 2017/0076715 A1 | 3/2017 | Ohtani et al. |
| 2017/0103451 A1 | 4/2017 | Alipov et al. |
| 2017/0154313 A1 | 6/2017 | Duerr et al. |
| 2017/0185944 A1 | 6/2017 | Volkov et al. |
| 2017/0200101 A1 | 7/2017 | Kumar et al. |
| 2017/0220973 A1 | 8/2017 | Byham et al. |
| 2017/0228749 A1 | 8/2017 | Larvol et al. |
| 2017/0293859 A1* | 10/2017 | Gusev ............... G06F 16/24578 |
| 2017/0309193 A1 | 10/2017 | Joseph et al. |
| 2017/0353477 A1 | 12/2017 | Faigon et al. |
| 2017/0364810 A1* | 12/2017 | Gusev .................... G06N 7/005 |
| 2017/0372225 A1 | 12/2017 | Foresti et al. |
| 2018/0005077 A1 | 1/2018 | Wang et al. |
| 2018/0143980 A1 | 5/2018 | Tanikella et al. |
| 2018/0144283 A1 | 5/2018 | Freitas et al. |
| 2018/0144654 A1 | 5/2018 | Olsen |
| 2018/0196579 A1 | 7/2018 | Standefer et al. |
| 2018/0293325 A1* | 10/2018 | Manickavasagam ... H04L 67/02 |
| 2018/0331897 A1 | 11/2018 | Zhang et al. |
| 2018/0357286 A1 | 12/2018 | Wang et al. |
| 2019/0138174 A1 | 5/2019 | Deets, Jr. et al. |
| 2019/0258985 A1 | 8/2019 | Guastella et al. |
| 2019/0266289 A1 | 8/2019 | Bartholomew |
| 2019/0318291 A1 | 10/2019 | Diriye et al. |
| 2019/0392547 A1 | 12/2019 | Katouzian et al. |
| 2020/0089684 A1* | 3/2020 | Gotmanov ............ G06F 16/953 |
| 2020/0327582 A1 | 10/2020 | Fedorova et al. |
| 2020/0372338 A1 | 11/2020 | Woods et al. |
| 2021/0073596 A1 | 3/2021 | Bezzubtseva et al. |
| 2021/0133606 A1 | 5/2021 | Bugakova et al. |

FOREIGN PATENT DOCUMENTS

| | | |
|---|---|---|
| CN | 105608318 A | 5/2016 |
| CN | 106203893 A | 12/2016 |
| CN | 106327090 A | 1/2017 |
| CN | 106446287 A | 2/2017 |
| CN | 106557891 A | 4/2017 |
| CN | 107767055 A | 3/2018 |
| CN | 107767058 A | 3/2018 |
| CN | 107909262 A | 4/2018 |
| CN | 104794573 B | 5/2018 |
| CN | 109272003 A | 1/2019 |
| CN | 109376237 A | 2/2019 |
| CN | 109522545 A | 3/2019 |
| CN | 109544504 A | 3/2019 |
| CN | 109670727 A | 4/2019 |
| CN | 110020098 A | 7/2019 |
| CN | 110503396 A | 11/2019 |
| CN | 110909880 A | 3/2020 |
| CN | 110928764 A | 3/2020 |
| CN | 111191952 A | 5/2020 |
| CN | 111291973 A | 6/2020 |
| CN | 111723930 A | 9/2020 |
| EP | 3438897 A1 | 2/2019 |
| KR | 102155790 B1 | 9/2020 |
| KR | 102156582 B1 | 9/2020 |
| RU | 2632143 C1 * | 10/2017 ......... G06F 17/3053 |
| RU | 2672171 C1 | 11/2018 |

(56) References Cited

FOREIGN PATENT DOCUMENTS

| WO | 001296 A2 | 2/2000 |
|---|---|---|
| WO | 2017222738 A1 | 12/2017 |

OTHER PUBLICATIONS

Office Action issued in respect of the related U.S. Appl. No. 16/852,512.
Vaibhav B. Sinha et al., "Fast Dawid-Skene: A Fast Vote Aggregation Scheme for Sentiment Classification", Deparlment of Computer Science and Engineering, Indian Institute of Technology Hyderabad, Telangana, Sep. 7, 2018; https://arxiv.org/abs/1803.02781.
Hongwei Li et al., "Error Rate Bounds in Crowdsourcing Models", Department of Statistics, UC Berkeley, Deparlment of EECS, UC Berkeley and Microsoft Research, Redmond, Jul. 10, 2013. https://arxiv.org/pdf/1307.2674.pdf.
Hongwei Li et al., "Error Rate Bounds and Iterative Weighted Majority Voting for Crowdsourcing", University of California, Berkeley, Nov. 15, 2014; https://arxiv.org/pdf/1411.4086.pdf.
Hideaki et al., "Analysis of Minimax Error Rate for Crowdsourcing and Its Application to Worker Clustering Model", https://arxiv.org/pdf/1802.04551.pdf Jun. 9, 2018.
Changbo et al., "Online Crowdsourcing", https://arxiv.org/abs/1512.02393, Submitted on Dec. 8, 2015 (v1), last revised Feb. 8, 2019 (this version, v2).
Vikas et al., "Eliminating Spammers and Ranking Annotators for Crowdsourced Labeling Tasks", Journal of Machine Learning Research 13 (2012)491-518 ; http://www.jmlr.org/papers/volume13/raykar12a/raykar12a.pdf.
Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.
Lease, "On Quality Control and Machine Learning in Crowdsourcing", School of Information, University of Texas at Austin; 2011, https://www.ischoolutexas.edu/~ml/papers/lease-hcomp11.pdf.
Gadiraju, "Understanding Malicious Behavior in Crowdsourcing Platforms: The Case of Online Surveys", http://eprints.whiterose.ac.uk/95877/1/Understanding%20malicious%20behaviour.pdf; 2015 https://doi.org/10.1145/2702123.2702443.
Carsten Eickhoff, "Cognitive Biases in Crowdsourcing", Dept. of Computer Science, Zurich, Switzerland, 2018, https://brown.edu/Research/AI/files/pubs/wsdm18.pdf.
Ece Kamar, "Identifying and Accounting for Task-Dependent Bias in Crowdsourcing", Microsoft Research, Redmond, WA, USA, 2015. http://erichorvitz.com/hcomp_2015_learning_bias.pdf.
D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.
Khazankin, "QOS-Based Task Scheduling in Crowdsourcing Environments", Distributed Systems Group, Vienna University of Technology, Argentinierstrasse 8/184-1, A-1040 Vienna, Austria, 2011.
Yuen, "Task recommendation in crowdsourcing systems", Crowdkdd '12 Proceedings of the First International Workshop on Crowdsourcing and Data Mining, pp. 22-26, Beijing, China, Aug. 2012.
Ustalov "Towards the Automated Collaborative Process for Language Resource Construction", Inzhenernyy vestnik Dona Journal, Issue No. 1(48), Published Mar. 20, 2018.
P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.
Thorsten et al. "A Collaborative Document Management Environment for Teaching and Learning", published on Jan. 2000, CVE, San Francisco, pp. 197-198 DOI:10.1145/351006.351044.
Office Action dated May 12, 2022 in respect of the related U.S. Appl. No. 16/832,095.
Notice of Allowance dated May 16, 2022 received in respect of a related U.S. Appl. No. 16/777,790.
Notice of Allowance dated Jun. 1, 2022 in respect of the related U.S. Appl. No. 16/503,977.
Li et al.,"Crowdsourced Data Management: A Survey", Published on Apr. 19, 2017, IEEE Transactions on Knowledge and Data Engineering, pp. 1-23, DOI:10.1109/ICDE.2017.26.
Federova et al.,"Latent Distribution Assumption for Unbiased and Consistent Consensus Modelling", Published on Jun. 20, 2019, arXiv:1906.08776v1.
Bugakova et al.,"Aggregation of pairwise comparisons with reduction of biases", Published on Jun. 9, 2019, arXiv:1906.03711v1.
Simpson et al., "Scalable Bayesian Preference Learning for Crowds", Published on Dec. 11, 2019 arXiv:1912.01987v2.
Notice of Allowance dated Jun. 2, 2022 received in respect of a related U.S. Appl. No. 16/906,074.
Yu, "Software Crowdsourcing Task Allocation Algorithm Based on Dynamic Utility", IEEE Access (vol. 7) pp. 33094-33106, Published Mar. 13, 2019.
Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). (Proceedings of the ACM Conference on Computer Supported Cooperative Work, CSCW). https://doi.org/10.1145/2441776.2441847.
Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.
Hung, "An Evaluation of Aggregation Techniques in Crowdsourcing", Web Information Systems Engineering—WISE 2013, 2013, vol. 8181, ISBN : 978-3-642-41153-3.
Steffen Schnitzer, "Demands on task recommendation in crowdsourcing platforms—the worker's perspective", Sep. 2015, Crowd Rec 19.
Chittilappilly et al. "A Survey of General-Purpose Crowdsourcing Techniques", Published on Sep. 1, 2016, IEEE Transactions on Knowledge and Data Engineering, vol. 28, Issue 9, pp. 2246-2266.
Notice of Allowance dated Feb. 15, 2023 received in respect of a related U.S. Appl. No. 16/832,095.
List et al.,"An Evaluation of Conceptual Business Process Modelling Languages", Published on Apr. 23, 2006, Dijon, France SAC'06, pp. 1532-1539.

\* cited by examiner

METHOD AND SYSTEM FOR RECEIVING LABEL FOR DIGITAL TASK EXECUTED WITHIN CROWD-SOURCED ENVIRONMENT

CROSS-REFERENCE

The present application claims priority to Russian Patent Application No. 2020107002, entitled "Method and System for Receiving Label for Digital Task Executed within Crowd-Sourced Environment", filed Feb. 14, 2020, the entirety of which is incorporated herein by reference.

FIELD

The present technology relates to methods and systems for receiving a label for a digital task, and more specifically, to methods and systems for receiving a label for a digital task executed in a computer-implemented crowd-sourced environment.

BACKGROUND

Crowdsourcing platforms, such as the Amazon Mechanical Turk™, make it possible to coordinate the use of human intelligence to perform tasks that computers are currently unable, in a shorter time and at a lower cost, compared to that needed by professional assessors.

Generally speaking, a crowdsourcing platform operates in a two-sided market ecosystem of requesters who post jobs known as Human Intelligence Tasks (HITs), and users who complete them in exchange for a monetary payment set by the requesters. The key goal of this two-sided market platform is to improve the experience of each side of the market and to make effective matching of their needs.

U.S. Patent Publication No. 2014/278634 A1 published Sep. 18, 2014 to Microsoft Technology Licensing LLC, discloses spatiotemporal crowdsourcing, in which a task including task criteria is received, and an actor set (e.g., human workers) are selected based upon user task preference data and task ability data with respect to accomplishing the task. The actor set is summoned to a location at a time to participate in the task. Spatiotemporal crowdsourcing may be implanted as a service that selects the actor set and tracks state information as to a completion state of the task.

U.S. Patent Publication No. 2015/317582 A1 published Nov. 5, 2015 to Microsoft Technology Licensing LLC, and titled OPTIMIZING TASK RECOMMENDATIONS IN CONTEXT-AWARE MOBILE CROWDSOURCING discloses various processes to optimize task recommendations for workers in mobile crowdsourcing scenarios by automatically identifying and recommending bundles of tasks compatible with workers' contexts (e.g., worker history, present or expected locations, travel paths, working hours, skill sets, capabilities of worker's mobile computing devices, etc.). The Context-Aware Crowdsourced Task Optimizer bundles tasks to both maximize expected numbers of completed tasks and to dynamically price tasks to maximize the system's utility, which is a function of task values and task completion rates. Advantageously, the resulting task identification and recommendation process incentivizes individual workers to perform more tasks in a shorter time period, thereby helping tasks to complete faster, even with smaller budgets. While such optimization problems are NP-hard, the Context-Aware Crowdsourced Task Optimizer exploits monotonicity and submodularity of various objective functions to provide computationally feasible task identification and recommendation algorithms with tight optimality bounds.

U.S. Patent Publication No. 2017/052761 A1 published Feb. 23, 2017 to Answerto LLC and titled EXPERT SIGNAL RANKING SYSTEM discloses a method of ranking and re-ranking a social networking service member's expertise and skills by collecting, analyzing and presenting signals from a member data set.

U.S. Patent Publication No. 2013/006717 A1 published Jan. 3, 2013 to CrowdFlower Inc., and titled EVALUATING A WORKER IN PERFORMING CROWD SOURCED TASKS AND PROVIDING IN-TASK TRAINING THROUGH PROGRAMMATICALLY GENERATED TEST TASKS discloses systems and methods for evaluating a worker in performing crowd sourced tasks and providing in-task training. In one aspect, embodiments of the present disclosure include a method, which may be implemented on a system, for selecting a job distributed through a job distribution platform for workers to work on, for use to generate a test task, the job being associated with a known correct result, associating a manipulated result, known to be an incorrect result for the job, with the job to generate the test task, and/or presenting the job with the manipulated result as the test task to a worker for evaluation of work quality of the worker. The job distribution platform crowd sources tasks online to workers to work on via their respective computing devices.

SUMMARY

Non-limiting embodiments of the present technology have been developed based on developer's appreciation of at least one technical shortcomings over at least some of the prior art solutions.

In developing the present technology, developers of the present technology have appreciated that assessors of a crowd-sourced platforms are generally non-professional and vary in levels of expertise. Thus, even though a task is usually provided by the platform with a description of what the task is (such as "on a scale of 1 to 10, label how relevant the search results are to the search query"), it may be difficult for an assessor to fully appreciate the task without having been provided with actual examples of what is expected between the different labels.

In accordance with a first broad aspect of the present technology, there is disclosed a computer-implemented method for receiving a label for a digital task executed within a computer-implemented crowd-sourced environment, the method being executed by a server, the method comprising: receiving, by the server, an indication of the digital task to be processed in the computer-implemented crowd-sourced environment; generating, by the server, a subset of examples, the subset of examples based on past digital tasks executed in the computer-implemented crowd-sourced environment, each of the subset of examples being similar to the digital task within a pre-determined similarity threshold; the subset of examples having a number of examples selected such that to provide maximum benchmark coverage with a minimum number of samples in the subset of examples; associating, by the server, the subset of examples to the digital task to be presented in the computer-implemented crowd-sourced environment; causing the digital task to be presented on a computing device of at least one crowd-sourced worker in the computer-implemented crowd-sourced environment to solicit the label for the digital task.

In some non-limiting embodiments of the method, the digital task is search engine result page (SERP) relevancy labelling task.

In some non-limiting embodiments of the method, the server is communicatively coupled to a SERP log database, the SERP log database comprising a plurality of SERPs previously generated, and wherein generating the subset of examples based on past digital tasks comprises: retrieving, from the SERP log database, the plurality of SERPs; transmitting the plurality of SERPs to a plurality of crowd-sourced worker in the computer-implemented crowd-sourced environment for evaluating a pertinence of each of the plurality of SERPs.

In some non-limiting embodiments of the method, the method further comprises: receiving, from the plurality of crowd-sourced worker, a plurality of labels for each of the plurality of SERPs; inputting, the plurality of labels into a first machine learning algorithm (MLA), the first MLA being configured to generate set of labels corresponding to the plurality of labels with a bias perception of the plurality of crowd-sourced worker removed.

In some non-limiting embodiments of the method, the method comprises: mapping the plurality of SERPs into a scale based on the set of labels; clustering, using a second MLA, the set of labels into one or more clusters, each of the one or more clusters providing maximum benchmark coverage of the scale, each cluster comprising a minimum number of SERP.

In some non-limiting embodiments of the method, the digital task comprises generating a sliding labelling scale, the sliding labelling scale having label indicators based on the subset of examples.

In some non-limiting embodiments of the method, the sliding scale is configured to enable the crowd-sourced worker to select one of the label indicators.

In some non-limiting embodiments of the method, selection of the label is done by the crowd-sourced worker executing an interaction with the label indicator, the interaction of a first type.

In some non-limiting embodiments of the method, the method further comprises in response to the crowd-sourced worker interacting with one of the label indicators using a second type of interaction, providing an associated example of the past digital tasks.

In some non-limiting embodiments of the method, the method further comprises training the second MLA.

In some non-limiting embodiments of the method, the training the second MLA is based on a training set, the training set including a pair of digital tasks and a training label indicative of usefulness of a first of the pair of digital tasks as an illustrative example for a second one of the pair of digital tasks.

In some non-limiting embodiments of the method, the training label is assigned by training crowd-sourced workers in the computer-implemented crowd-sourced environment.

In some non-limiting embodiments of the method, the training label is further indicative of redundancy of the pair of digital tasks as the illustrative example.

In some non-limiting embodiments of the method, the method further comprises determining a step between each of the one or more clusters.

In some non-limiting embodiments of the method, the determining the step is executed by the second MLA.

In some non-limiting embodiments of the method, the step is visually represented in the sliding labelling scale as distance between samples in the subset of examples In some non-limiting embodiments of the method, the step is indicative of illustrative closeness between the subset of examples.

In accordance with another broad aspect of the present technology, there is disclosed a system for receiving a label for a digital task executed within a computer-implemented crowd-sourced environment, the system comprising a server, the server comprising a processor configured to: receive, an indication of the digital task to be processed in the computer-implemented crowd-sourced environment; generate, a subset of examples, the subset of examples based on past digital tasks executed in the computer-implemented crowd-sourced environment, each of the subset of examples being similar to the digital task within a pre-determined similarity threshold; the subset of examples having a number of examples selected such that to provide maximum benchmark coverage with a minimum number of samples in the subset of examples; associate the subset of examples to the digital task to be presented in the computer-implemented crowd-sourced environment; cause the digital task to be presented on a computing device of at least one crowd-sourced worker in the computer-implemented crowd-sourced environment to solicit the label for the digital task.

In some non-limiting embodiments of the system, the digital task is search engine result page (SERP) relevancy labelling task.

In some non-limiting embodiments of the system, the server is communicatively coupled to a SERP log database, the SERP log database comprising a plurality of SERPs previously generated, and wherein to generate the subset of examples based on past digital tasks, the processor is configured to: retrieve, from the SERP log database, the plurality of SERPs; transmit the plurality of SERPs to a plurality of crowd-sourced worker in the computer-implemented crowd-sourced environment for evaluating a pertinence of each of the plurality of SERPs.

In some non-limiting embodiments of the system, the processor is further configured to: receive, from the plurality of crowd-sourced worker, a plurality of labels for each of the plurality of SERPs; input, the plurality of labels into a first machine learning algorithm (MLA), the first MLA being configured to generate set of labels corresponding to the plurality of labels with a bias perception of the plurality of crowd-sourced worker removed.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid-state drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
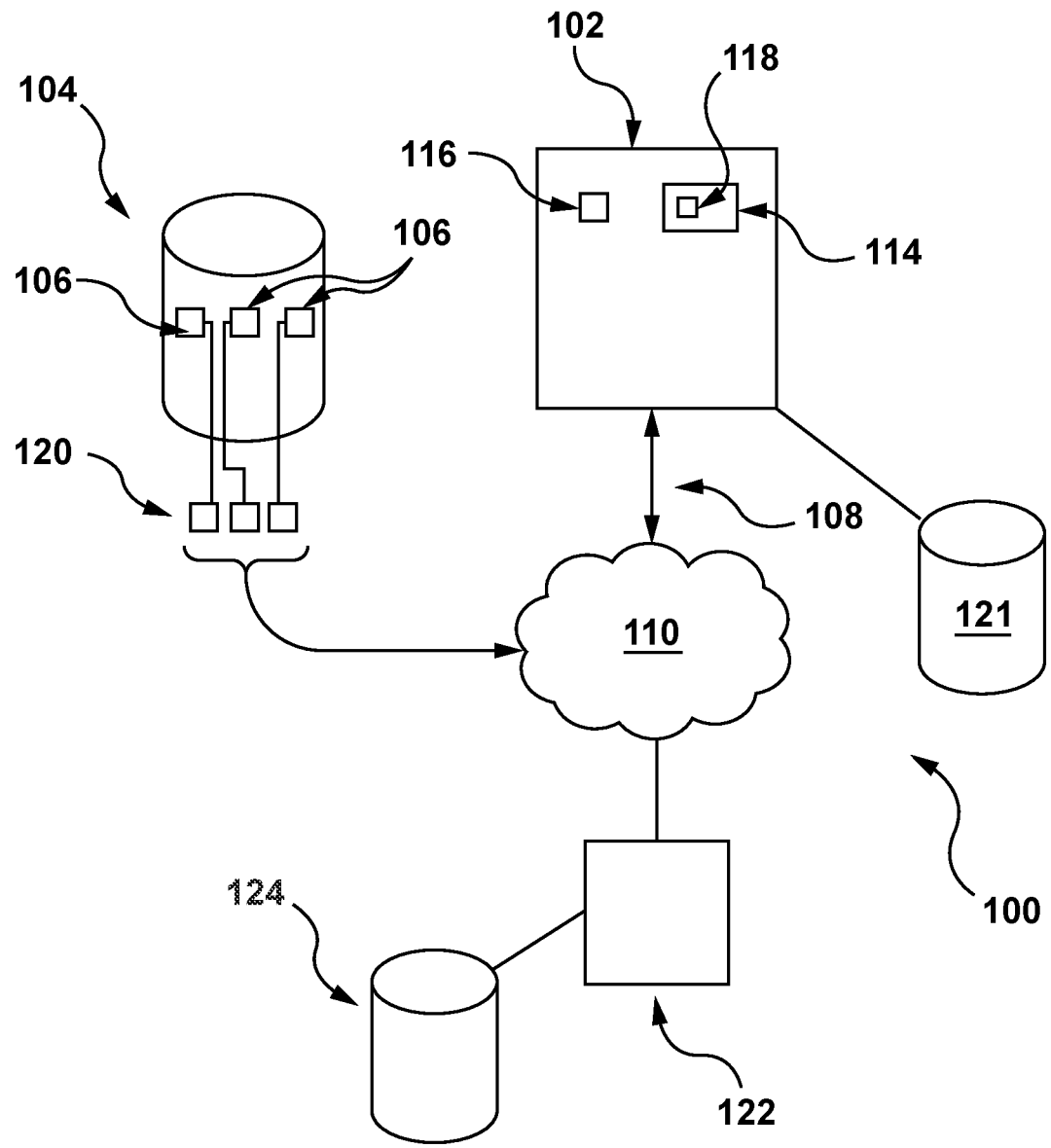
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. Thus, the system 100 is an example of a computer-implemented crowd-sourced system 100.

It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of an identity of a plurality of human assessors 106, who has indicated his/her availability for completing at least one type of a crowd-sourced project and/or who have completed one crowd-sourced task in the past and/or registered for completing at least one type of the crowd-sourced task.

In some non-limiting embodiments of the present technology, the database 104 is under control and/or management of a provider of crowd-sourced services, such as Yandex LLC of Lev Tolstoy Street, No. 16, Moscow, 119021, Russia. In alternative non-limiting embodiments of the present technology, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling a two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that in alternative non-limiting embodiments of the present technology, the database 104 can be stored at least in part at the server 102 and/or be managed at least in part by the server 102. In accordance with the non-limiting embodiments of the present technology, the database 104 comprises sufficient information associated with the identity of at least some of the plurality of human assessors 106 to allow an entity that has access to the database 104, such as the server 102, to assign and transmit one or more tasks to be completed by the one or more human assessors 106.

At any given time, the plurality of human assessors 106 may comprise a different number of human assessors 106, such as fifty human assessors 106, who are available to complete tasks. The plurality of human assessors 106 could include more or fewer human assessors 106.

The server 102 can be implemented as a conventional computer server. In an example of a non-limiting embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments of the present technology, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a project database 121. In alternative non-limiting embodiments of the present technology, the project database 121 may be communicatively coupled to the server 102 via the communication network 110. Although the project database 121 is illustrated schematically herein as a single entity, it is contemplated that the project database 121 may be configured in a distributed manner.

The project database 121 is populated with a plurality of projects (not depicted), each project comprising a plurality of human intelligence tasks (HITs, hereinafter "digital task" or, simply "tasks").

How the project database 121 is populated with the plurality of projects is not limited. Generally speaking, one or more requesters (not shown) may submit one or more projects to be completed to the crowd-sourcing application 118 (which are then stored in the project database 121). In some non-limiting embodiments of the present technology, the one or more requesters may specify the type of assessors the project/task is destined to, and/or a budget to be allocated to a human assessor completing tasks included in the project.

How the projects are implemented is not limited. In some non-limiting embodiments of the present technology, the project database 121 includes projects that are Search Engine Result Page (SERP) ranking projects.

A SERP ranking project includes one or more tasks in which the human assessors 106 are asked to select how relevant a SERP is to a given query.

In some non-limiting embodiments of the present technology, the project database 121 also includes projects that are non-SERP ranking projects. For example, non-SERP ranking projects may comprise tasks that display an image of an object (such as an animal) and the human assessors are asked to label whether it meets a particular condition (such as the presence of a dog).

The server 102 is configured to communicate with various entities via the communication network 110. Examples of the various entities include the database 104, an electronic device 120 associated with each of the human assessors 106, and other devices that may be coupled to the communication network 110. Accordingly, the crowd-sourcing application 118 is configured to retrieve a given project from the project database 121 and send the given project to the electronic device 120 used by the human assessor 106 to complete the given project, via the communication network 110 for example. Similarly, in some non-limiting embodiments of the present technology, the server 102 is configured to receive a set of responses to the tasks of the given project that has been completed by the human assessor 106.

It is contemplated that any suitable file transfer technology and/or medium could be used for this purpose. It is also contemplated that the project could be submitted to the human assessor 106 via any other suitable method, such as by making the project remotely available to the human assessor 106.

In some non-limiting embodiments of the present technology, a search engine server 122 is further communicatively coupled to the communication network 110. In alternative non-limiting embodiments of the present technology, the search engine server 122 may be communicatively coupled to the server 102 via a dedicated link, without departing from the teachings of the present technology.

The search engine server 122 may be implemented as a conventional computer server similar to the server 102. In the depicted non-limiting embodiment of the present technology, the search engine server 122 is a single server. In alternative non-limiting embodiments of the present technology, the functionality of the search engine server 122 may be distributed and may be implemented via multiple servers.

The functionality of the search engine server 122 is well-known in the art and will not be described in detail herein. Generally speaking, the search engine server 122 is under control and/or management of a search engine provider (not depicted), such as for example, an operator of the Yandex™ search engine. As such, the search engine server 122 may be configured to execute one or more search applications (not illustrated) configured to execute searches responsive to "search string" entered by a user into an associated electronic device, and present a search engine result page (SERP) to the user.

In some non-limiting embodiments of the present technology, the search engine server 122 is communicatively coupled to a SERP log database 124 via a dedicated link (not numbered). In alternative embodiments of the present technology, the SERP log database 124 may be communicatively coupled to the search engine server 122 via the communication network 110. Although the SERP log database 124 is illustrated herein as a single entity, it is contemplated that the SERP log database 124 may be configured in a distributed manner.

The SERP log database 124 is populated with a plurality of SERPs that have been previously generated by the one or more search applications. How the SERP log database 124 gets populated with the plurality of SERPs is not limited. Generally speaking, in response to generating a SERP to a user inputted query (i.e. a "search string"), such SERP is stored within the SERP log database 124 (along with being provided to a user submitting the search string).

Although the description of the system 100 has been made with reference to various hardware entities (such as the database 104, the server 102, the project database 121, the search engine server 122 and the SERP log database 124 and the like) depicted separately, it should be understood that this is done for ease of understanding. It is contemplated that the various functions executed by these various entities can be executed by a single entity or be distributed among different entities.

Crowd-Sourcing Application 118

Figure 2:
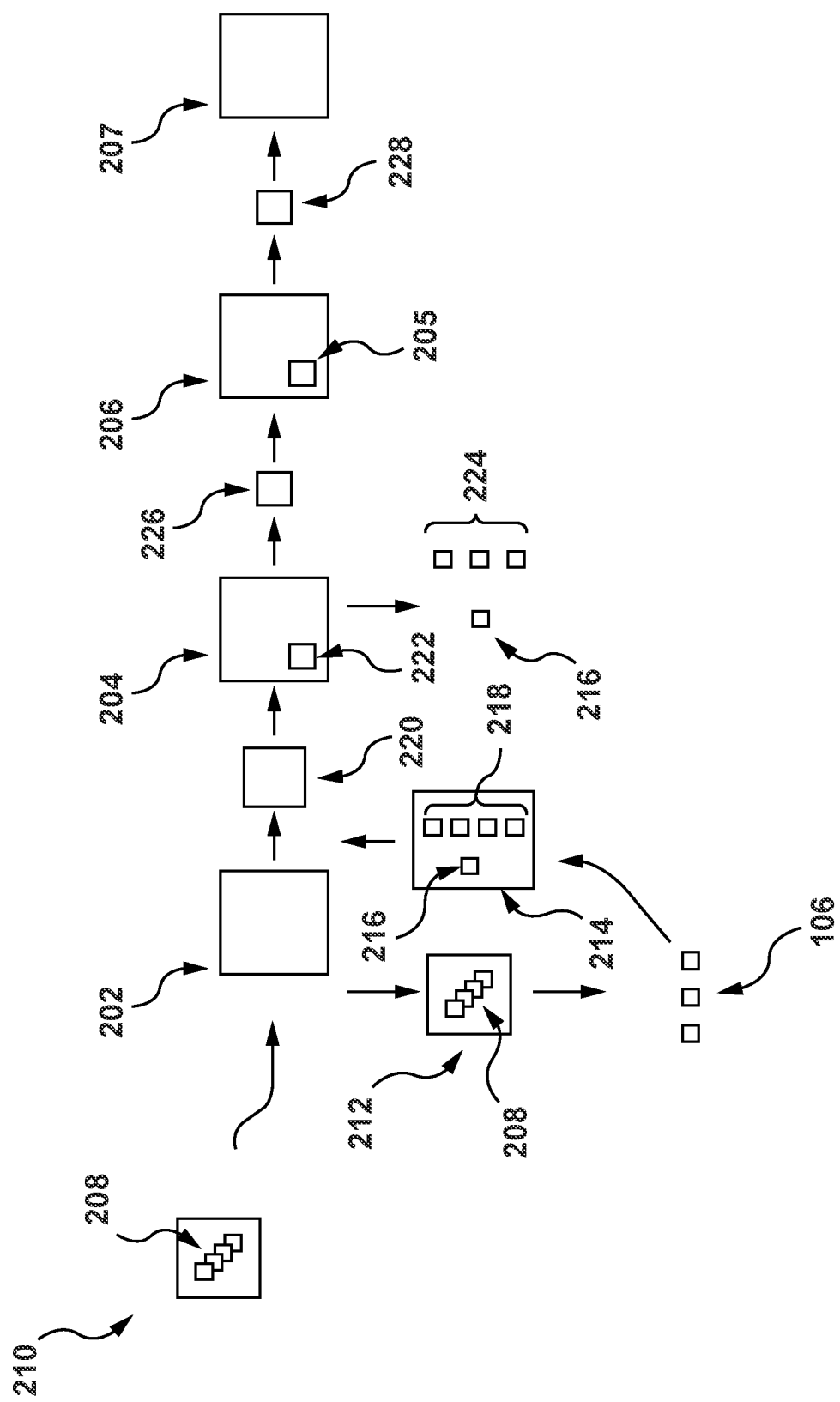
FIG. 2 depicts a schematic diagram of a process for generating a set of examples for a task to be executed in a crowd-sourced environment of the system of FIG. 1, the process implemented in accordance with non-limiting embodiments of the present technology.

With reference to FIG. 2, there is depicted a schematic diagram of a process to generating a set of example labels for a labelling task executed in a crowd-source environment. The process for generating the set of example labels is executed by the crowd-sourcing application 118 (see FIG. 1) implemented in accordance with a non-limiting embodiment of the present technology. The crowd-sourcing application 118 executes (or otherwise has access to): a sourcing routine 202, a mapping routine 204, a clustering routine 206 and an outputting routine 207.

In the context of the present specification, the term "routine" refers to a subset of the computer executable program instructions of the crowd-sourcing application 118 that is executable by the server processor 116 (the sourcing routine 202, the mapping routine 204 the clustering routine 206 and the outputting routine 207). For the avoidance of any doubt, it should be expressly understood that the sourcing routine 202, the mapping routine 204 and the clustering routine 206 are illustrated herein as separate entities for ease of explanation of the processes executed by the crowd-sourcing application 118. It is contemplated, however, that some or all of the sourcing routine 202, the mapping routine 204, the clustering routine 206 and the outputting routine 207 may be implemented as one or more combined routines.

For ease of understanding the present technology, functionality of each of the sourcing routine 202, the mapping routine 204 the clustering routine 206 and the outputting routine 207, as well as data and/or information processed or stored therein are described below.

Sourcing Routine 202

The sourcing routine 202 is configured to receive a data packet 210 from the SERP log database 124 (see FIG. 1). The data packet 210 comprises a plurality of previously generated SERPs.

How the sourcing routine 202 is configured to receive the data packet 210 is not limited. For example, the data packet 210 may be transmitted to the sourcing routine 202 in response to the SERP log database 124 having stored a plurality (such as 10 or more) SERPs 208.

In some non-limiting embodiments of the present technology, the plurality of SERPs 208 may each be associated with a search query that is unique within the plurality of SERPs 208. In other words, the plurality of SERPs 208 does not include multiple SERPs that have been generated for the same search query.

It should be understood that the plurality of SERPs 208 may include SERPs that have search results that are different in their relevancy to their respective search queries. In some non-limiting embodiments of the present technology, the data packet 210 does not need to include the entire SERP generated in response to a search query, but rather only one or more top results generated in response to the search query. In further non-limiting embodiments of the present technology, the data packet 210 may include persistent top result(s), i.e. a top result that has been generated in response to a given query over a number of searches (such as multiple searches over a number of days from various users of the search engine).

In some non-limiting embodiments of the present technology, in response to receiving the data packet 210, the sourcing routine 202 is configured to transmit the plurality of SERPs 208 to the plurality of assessors 106 (see FIG. 1).

More precisely, the sourcing routine 202 is configured to transmit the plurality of SERPs 208 to the plurality of assessors 106 and request the plurality of assessors 106 to evaluate the pertinence of the ranked search results (or the top search result, for example) included in the SERPs vis-à-vis the respective search query (which is included within the SERP). As such, it should be understood that a given SERP includes the search query and one or more ranked search results.

As such, the sourcing routine 202 is configured to transmit a data packet 212 comprising the plurality of SERPs 208 with instructions to label a degree of pertinence to the included SERPs (or the top result portion thereof) to the plurality of assessors 106. In some non-limiting embodiments of the present technology, the task to label the degree of pertinence is a binary task, where the assessor selects one of two labels (for example, a first label indicating that the SERP is pertinent to the query, and a second label indicating that the SERP is not pertinent to the query). In alternative non-limiting embodiments of the present technology, the task to label the degree of pertinence is made with a continuous scale, where the assessor selects on a scale (for example, 1 to 10) the pertinence of the SERP to the query (such as 1 being not pertinent, and 10 being highly pertinent, and 5 being somewhat pertinent).

The sourcing routine 202 is then configured to receive a data packet 214 from the plurality of assessors 106. The data packet 214 comprises a SERP 216 (one of the plurality of SERPs 208) and a plurality of labels 218 having been assigned by the plurality of assessors 106.

Although only one instance of SERP (i.e. the SERP 216) is illustrated in the data packet 214, this is done merely for ease of understanding, and it should be understood that the data packet 214 may comprise all, if not more than a single, plurality of SERPs that have been transmitted in the data packet 212 together with the plurality of labels assigned for each SERP by the assessors 106. It is also noted that a given SERP may have been labelled by more than one of the plurality of assessors 106. In other words, the given SERP may have several labels associated therewith, each label having been assigned by a different one of the plurality of assessors 106.

The sourcing routine 202 is then configured to transmit a data packet 220 to the mapping routine 204. The data packet 220 comprises the plurality of SERPs 208 and the plurality of labels 218 that have been assigned to each of the SERP of the plurality of SERPs 208.

Mapping Routine 204

In response to receiving the data packet 220, the mapping routine 204 is configured to execute the following functions.

It should be understood that, generally speaking, the plurality of assessors 106 that have assigned the plurality of labels 218 are generally non-professionals and may unconsciously be affected by (due to perceptual reasons) bias that is irrelevant to the task.

As such, the mapping routine 204 is configured to execute a first machine learning algorithm (MLA) 222 trained to receive, for each of the SERP, the plurality of labels 218 that have been assigned, and generate a set of unbiased labels for each of the SERP.

How the first MLA 222 is trained and configured to generate the set of unbiased labels is not limited. An example of generating the set of unbiased labels is disclosed in a co-owned Russian Patent Application No. 2019/135532 filed Nov. 5, 2019 and entitled "METHOD AND SYSTEM FOR SELECTING LABEL FROM PLURALITY OF LABELS FOR TASK IN CROWD-SOURCED ENVIRONMENT", the content of which is incorporated by reference herein in its entirety.

Let us assume, for example, that for the SERP 216, a set of unbiased labels 224 has been generated by the first MLA 222. The mapping routine 204 is then configured to select a majority label from the set of unbiased labels 224. More precisely, recalling that a given SERP may have been labelled by more than one of the plurality of assessors 106, the mapping routine 204 is configured to select a single label from the set of unbiased labels 224. How the mapping routine 204 is configured to select the single label is not limited, and for example, the single label may correspond to the label that occurs the most within the set of unbiased labels 224.

Having determined the majority label for each of the SERP included in the plurality of SERPs 208, the mapping routine 204 is configured to map each of SERP in a scale based on their respective majority label.

Figure 3:
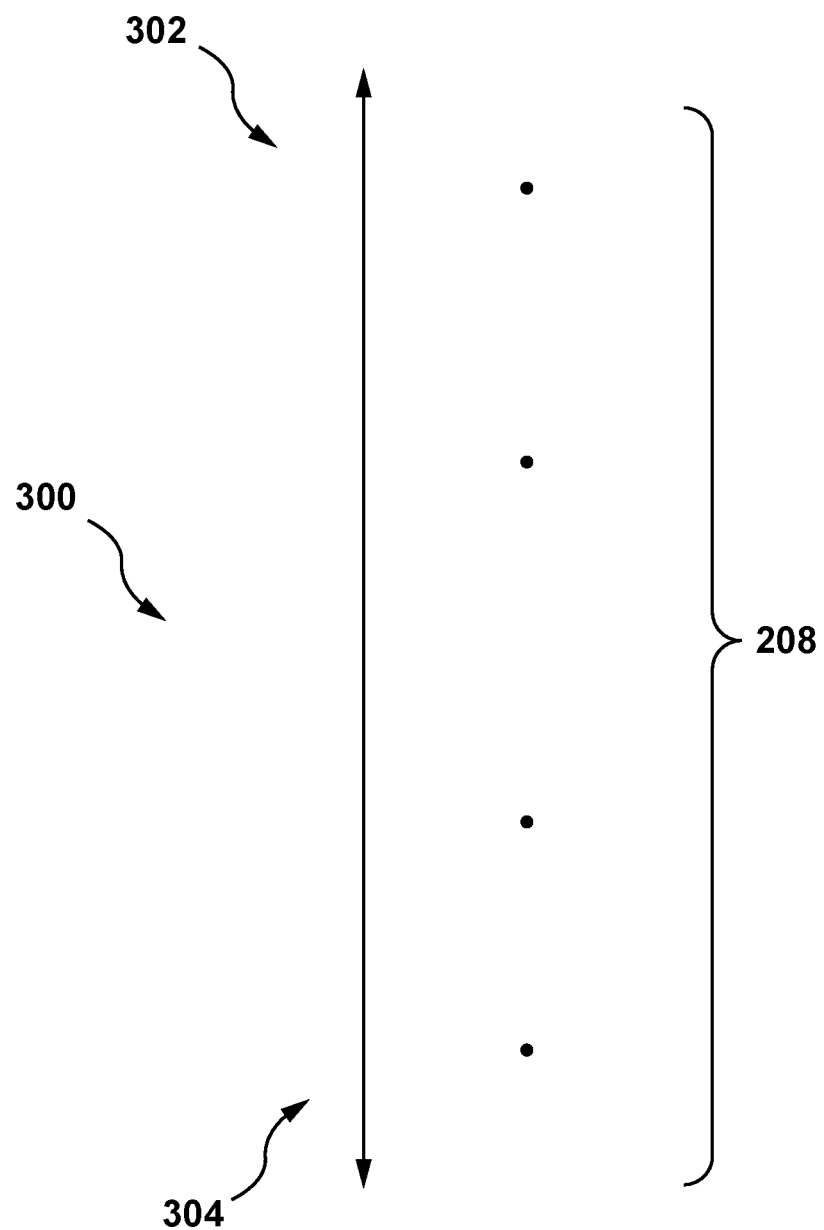
FIG. 3 depicts a schematic illustration of a set of unbiased labels being mapped onto a scale, the mapping implemented in accordance with non-limiting embodiments of the present technology.

With reference to FIG. 3, a schematic illustration of the set of unbiased labels 224 being mapped into a scale 300 by the mapping routine 204 is depicted.

As illustrated, the plurality of SERPs 208 (illustrated as dots) is mapped into the scale 300. In the illustrated embodiment, a total of 4 SERPs are illustrated as dots. Although the scale 300 is illustrated as a one-dimensional space, this is merely done for ease of presentation, and it should be understood that the scale 300 may be implemented as an n-dimensional space.

How the scale 300 is implemented is not limited. For example, in the illustrated embodiment, a top end 302 of the scale 300 is indicative of high pertinence of the SERP to the associated query, and a low end 304 of the scale 300 is indicative of low pertinence of the SERP to the associated query.

Returning to FIG. 2, having generated the scale 300, the mapping routine 204 is then configured to transmit a data packet 226 to the clustering routine 206. The data packet 226 comprises the scale 300.

Clustering Routine 206

In response to receiving the data packet 226, the clustering routine 206 is configured to execute the following functions.

First, the clustering routine 206 is configured to access the scale 300 and execute a second MLA 205 configured to cluster the plurality of SERPs 208, where each similar SERPs in relevancy is clustered into a same cluster.

The manner in which the second MLA 205 is implemented is not limited, and may be based on a k-means clustering algorithm, a centroid-based clustering algorithm, a distribution-based clustering algorithm, a density-based clustering algorithm, and the like.

Figure 4:
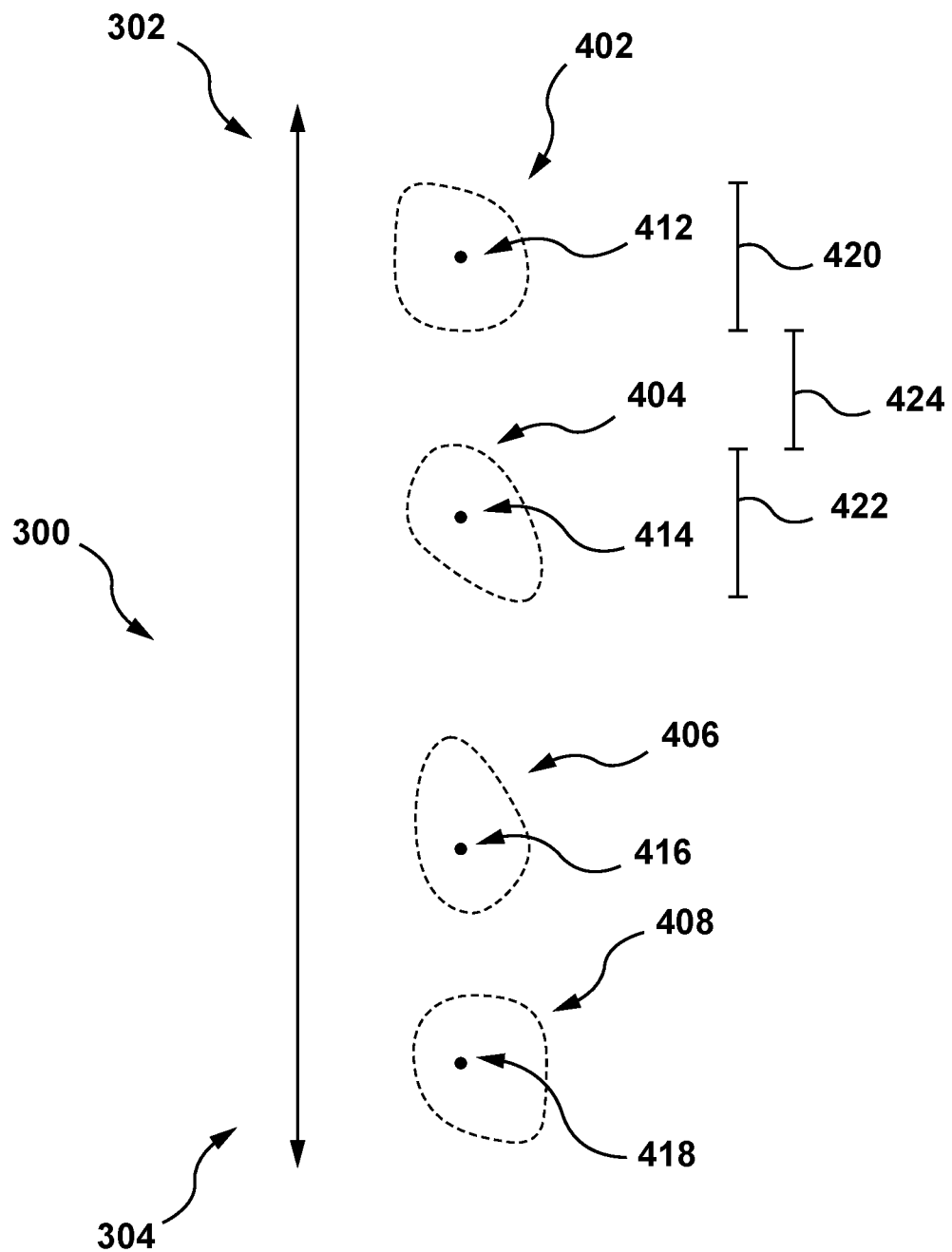
FIG. 4 depicts a schematic illustration of a plurality of SERPs being clustered, the clustering being implemented in accordance with non-limiting embodiments of the present technology.

With reference to FIG. 4, a schematic illustration of the plurality of SERPs 208 being clustered by the second MLA 205 is depicted.

As illustrated, the plurality of SERPs 208 has been clustered into four clusters, namely a first cluster 402, a second cluster 404, a third cluster 406 and a fourth cluster 408. Needless to say, it is contemplated that the second MLA 205 clusters the plurality of SERPs 208 into more or less than four clusters. It is noted that the number of clusters is not pre-determined and in accordance with the non-limiting embodiments of the present technology, the second MLA 205 is configured to determine the appropriate number of clusters (described in detail below).

It is also noted that the MLA 205 can be trained in a non-supervised manner. The MLA 205 can be trained such as to minimize the dispersion of labels of the SERPs that have been put into a given cluster.

In some non-limiting embodiments of the present technology, a number of clusters corresponds to a number of SERPs included within the plurality of SERPs 208. As such, the first cluster 402 comprises a first SERP 412, the second cluster 404 comprises a second SERP 414, the third cluster 406 comprises a third SERP 416, and the fourth cluster 408 comprises a fourth SERP 418.

In some non-limiting embodiments of the present technology, each of the clusters defines a maximum benchmark coverage, which corresponds to a portion of the scale 300.

For example, taking the first cluster 402 as an example, it has a first maximum benchmark coverage 420, which is indicative that the first SERP 412 is a relevant example to a first portion within the scale 300. In another example, the second cluster 404 has a second maximum benchmark coverage 422 which is indicative that the second SERP 414 is a relevant example to a second portion within the scale 300.

In some non-limiting embodiments of the present technology, the distance between each maximum benchmark coverage defines a step. For example, the difference between the first maximum benchmark coverage 420 and the second maximum benchmark coverage 422 defines a step 424.

How the first maximum benchmark coverage 420 and the second maximum benchmark coverage 422 (as well as the remaining maximum benchmark coverages not illustrated) are determined by the second MLA 205 is not limited. For example, the second MLA 205 may be trained based on a training set including a pair of tasks and training labels (which may be assigned by training crowd-source assessors, i.e. trustworthy assessors), where each label is indicative of how relevant the task is within a given portion of the scale 300. As such, the second MLA 205 is trained to provide the maximum coverage for each cluster including a minimum number of SERPs (such as only one SERP) in response to receiving the scale 300.

Returning to FIG. 2, the clustering routine 206 is then configured to transmit a data packet 228 to the outputting routine 207. The data packet 228 comprises each SERP included within each clusters, namely the first SERP 412, the second SERP 414, the third SERP 416 and the fourth SERP 418, together with their respective one or more maximum benchmark coverages and steps.

It should be noted that although in the above example, each of the SERP included in the plurality of SERPs 208 has been clustered individually, it is not limited as such. It is contemplated that the second MLA 205 be configured to cluster, within a single cluster, two or more SERPs that have a similarity in terms of relevancy above a pre-determined threshold. In such situation, the clustering routine 206 is configured to select only a single SERP for each cluster to be included within the data packet. How the clustering routine 206 selects such single SERP from a cluster with multiple SERP is not limited, and may for example be done randomly.

Outputting Routine 207

In response to receiving the data packet 228, the outputting routine 207 is configured to generate a set of example labels.

Briefly referring back to FIG. 1, let us assume that an assessor 106 has requested the crowd-sourcing application 118 to perform a SERP ranking project, or any project similar to the ones executed by the assessors 106 submitted by the sourcing routine 202.

In response to the request, the outputting routine 207 is configured to access the project database 121 and retrieve the SERP ranking project.

The outputting routine 207 is then configured to cause the electronic device 120 associated with the requesting assessor 106 to display the description of the SERP ranking project together with an indication of the first SERP 412, the second SERP 414, the third SERP 416 and the fourth SERP 418 as examples.

Figure 5:
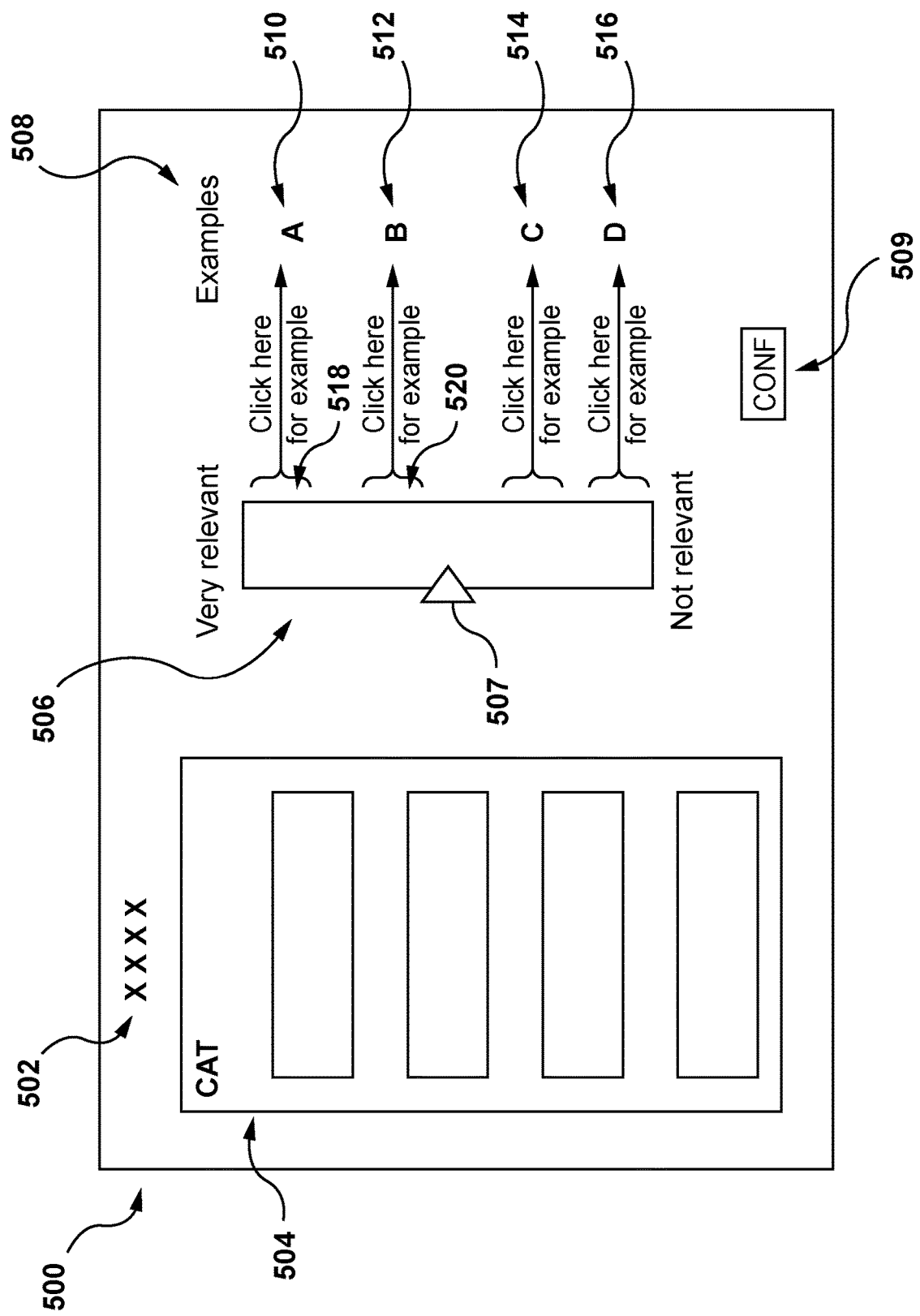
FIG. 5 depicts a schematic illustration of a screen shot of a crowd-sourced interface implemented in accordance with a non-limiting embodiment of the present technology.

With reference to FIG. 5, there is depicted a screen shot of a crowd-sourced interface 500 implemented in accordance with a non-limiting embodiment of the present technology (the example of the interface 500 depicted as displayed on the screen of one of the electronic devices 120). The interface 500 illustrates a SERP ranking task.

The interface 500 includes instruction 502 to the human assessor 106 and a SERP 504. For the avoidance of any doubt, it should be mentioned that text (and more specifically each letter) included within the interface 500 is represented by "X", however, in reality the text is made up of words in a given language (such as English). For example, the instruction 502 may comprise instructions to the assessors 106 to select, from a sliding labelling scale 506, a relevancy of the SERP 504 to the search phrase "Cat".

In some non-limiting embodiments of the present technology, the sliding labelling scale 506 allows the assessor 106 to assign a relevancy of the SERP 504 to the search phrase using a sliding arrow 507 and confirming using a button 509.

Although the interface 500 illustrates the sliding labelling scale 506 in a continuous manner, it is not limited as such. For example, instead of a sliding labelling scale 506, the label may be implemented with any number of values, words, colors, and the like.

In some non-limiting embodiments of the present technology, the interface 500 further includes a set of examples 508. The set of examples 508 comprises a first example 510, a second example 512, a third example 514 and a fourth example 516. Each of the first example 510, the second example 512, the third example 514 and the fourth example 516 is associated with a respective portion of the sliding labelling scale 506.

In some non-limiting embodiments of the present technology, each of the first example 510, the second example 512, the third example 514 and the fourth example 516 is associated to the first SERP 412, the second SERP 414, the third SERP 416 and the fourth SERP 418, respectively.

As discussed above, each of the first SERP 412, the second SERP 414, the third SERP 416 and the fourth SERP 418 are associated with a respective maximum benchmark coverage within the scale 300. In some non-limiting embodiments of the present technology, the outputting routine 207 is configured to place each of the first example 510, the second example 512, the third example 514 and the fourth example 516 while reflecting their respective maximum benchmark coverage (albeit adjusting it from the scale 300 to the sliding labelling scale 506).

For example, a first portion 518 on the sliding labelling scale 506 may correspond to the first maximum benchmark coverage 420, and the assessor 106 may click on the first example 510 to determine what is expected in terms of relevancy to select the label within the first portion 518. In another example, a second portion 520 on the sliding labelling scale 506 may correspond to the second maximum benchmark coverage 422, and the assessor may click on the second example 512 to determine what is expected in terms of relevance to select a label within the second portion 520. As such, it should be understood that each of the first example 510, the second example 512. The third example 514 and the fourth example 516 each provide a maximum benchmark coverage respectively, using only a minimum number of examples (namely only one). It should also be noted that the first portion 518 and the second portion 520 are separated by a distance (not numbered), which corresponds to the step 424.

Although all of the examples (the first example 510, the second example 512, the third example 514 and the fourth example 516) have been previously labelled by the plurality of assessors 106, it is not limited as such. It is contemplated the one or more examples be labelled by one or more golden assessors (i.e. a professional assessor or an assessor of higher quality) and also using those examples together with the examples labelled by the plurality of assessors 106.

Figure 6:
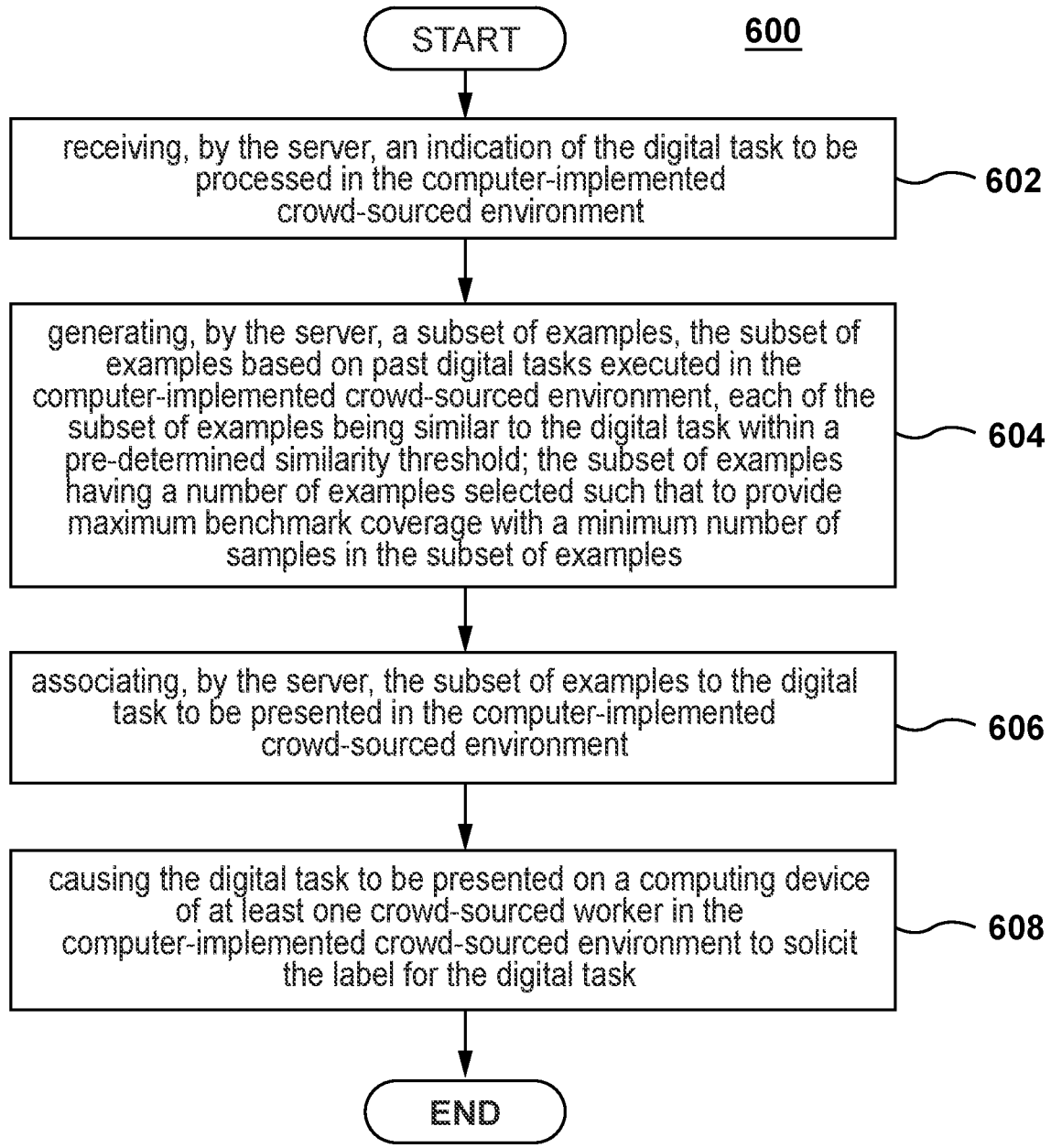
FIG. 6 depicts a block diagram of a flow chart of a method for generating a set of examples for a task to be executed in a crowd-sourced environment.

Given the architecture and examples provided herein above, it is possible to execute a computer-implemented method for receiving a label for a digital task executed within a computer-implemented crowd-sourced environment. With reference to FIG. 6, there is depicted a flow chart of a method 600, the method 600 being executable in accordance with non-limiting embodiments of the present technology. The method 600 can be executed by the server 102.

Step 602: Receiving, by the Server, an Indication of the Digital Task to be Processed in the Computer-Implemented Crowd-Sourced Environment The method 600 being with step 602, where crowdsourcing application 118 is configured to receive a request to execute a project by an assessor 106.

Step 604: Generating, by the Server, a Subset of Examples, the Subset of Examples Based on Past Digital Tasks Executed in the Computer-Implemented Crowd-Sourced Environment, Each of the Subset of Examples being Similar to the Digital Task within a Pre-Determined Similarity Threshold; the Subset of Examples Having a Number of Examples Selected Such that to Provide Maximum Benchmark Coverage with a Minimum Number of Samples in the Subset of Examples At step 604, the clustering routine 206 is configured to select a set of examples, namely the first SERP 412, the second SERP 414, the third SERP 416 and the fourth SERP 418, which are SERP that has been previously labelled by the plurality of assessors 106.

Step 606: Associating, by the Server, the Subset of Examples to the Digital Task to be Presented in the Computer-Implemented Crowd-Sourced Environment At step 606, the outputting routine 207 is configured to associate each of the first example 510, the second example 512, the third example 514, and the fourth example 516 to a respective label included within the sliding labelling scale 506.

Step 608: Causing the Digital Task to be Presented on a Computing Device of at Least One Crowd-Sourced Worker in the Computer-Implemented Crowd-Sourced Environment to Solicit the Label for the Digital Task At step 608, the outputting routine 207 is configured to cause the electronic device 120 associated with the requesting assessor 106 to display the interface 500 and solicit the requesting assessor 106 to select a label from the sliding labelling scale 506.

It should be apparent to those skilled in the art that at least some embodiments of the present technology aim to expand a range of technical solutions for addressing a particular technical problem encountered by the conventional crowdsourcing technology, namely determining a productivity rate of a given human assessor with regards to a project.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for receiving a label for a digital task executed within a computer-implemented crowd-sourced environment, the digital task corresponding to a search engine result page (SERP) relevancy labelling task, the method being executed by a server, the server being coupled communicatively to:
  a SERP log database, the SERP log database comprising a plurality of SERPs previously generated;
the method comprising:
  receiving, by the server, an indication of the digital task to be processed in the computer-implemented crowd-sourced environment;
  retrieving, from the SERP log database, the plurality of SERPs;
  transmitting the plurality of SERPs to a plurality of crowd-sourced worker in the computer-implemented crowd-sourced environment for evaluating a pertinence of each of the plurality of SERPs;
  receiving, from the plurality of crowd-sourced worker, a plurality of labels for each of the plurality of SERPs;
  inputting, the plurality of labels into a first machine learning algorithm (MLA) configured to generate a set of unbiased labels corresponding to the plurality of labels with a bias perception of the plurality of crowd-sourced worker removed;
  determining, by the server, a subset of examples comprising a subset of the plurality of SERPs and associated unbiased labels, each of the subset of examples being similar to the digital task within a pre-determined similarity threshold;
  mapping, by the server, the plurality of SERPs into a scale of n-dimensional space based on the associated unbiased labels;
  inputting, by the server, the n-dimensional scale into a second MLA configured to generate one or more clusters, each of the one or more clusters providing maximum benchmark coverage of the n-dimensional scale, each cluster comprising a minimum number of SERP, wherein the second MLA has previously been trained based on a training set, the training set including a pair of digital tasks and a training label indicative of usefulness of a first of the pair of digital tasks as an illustrative example for a second one of the pair of digital tasks;
  associating, by the server, the subset of examples to the digital task to be presented in the computer-implemented crowd-sourced environment;
  causing the digital task to be presented on a computing device of at least one crowd-sourced worker in the computer-implemented crowd-sourced environment to solicit the label for the digital task;
  determining, by the server, a step corresponding to a distance between each of the one or more clusters; and
  generating, by the server, a sliding labelling scale, the sliding labelling scale having label indicators based on the subset of examples, selection of the label being done by the crowd-sourced worker executing an interaction with the label indicator, the interaction of a first type.

2. The method of claim 1, wherein the sliding scale is configured to enable the crowd-sourced worker to select one of the label indicators.

3. The method of claim 1, wherein the method further comprises generating one or more links each associated with a respective label indicator, and wherein providing an associated example of the past digital tasks with the label indicator in response to the crowd-sourced worker interacting with the associated one of the links.

4. The method of claim 1, wherein the training label is assigned by training crowd-sourced workers in the computer-implemented crowd-sourced environment.

5. The method of claim 1, wherein the determining the step is executed by the second MLA.

6. The method of claim 1, wherein the step is visually represented in the sliding labelling scale as distance between samples in the subset of examples.

7. The method of claim 1, wherein the step is indicative of illustrative closeness between the subset of examples.

8. A system for receiving a label for a digital task executed within a computer-implemented crowd-sourced environment, the digital task corresponding to a search engine result page (SERP) relevancy labelling task, the system comprising a server coupled communicatively to:
  a SERP log database, the SERP log database comprising a plurality of SERPs previously generated;
the server comprising a processor configured to:
  receive, an indication of the digital task to be processed in the computer-implemented crowd-sourced environment;
  retrieve, from the SERP log database, the plurality of SERPs;
  transmit the plurality of SERPs to a plurality of crowd-sourced worker in the computer-implemented crowd-sourced environment for evaluating a pertinence of each of the plurality of SERPs;
  receive, from the plurality of crowd-sourced worker, a plurality of labels for each of the plurality of SERPs;
  input, the plurality of labels into a first machine learning algorithm (MLA), configured to generate a set of unbiased labels corresponding to the plurality of labels with a bias perception of the plurality of crowd-sourced worker removed;
  determine, a subset of examples comprising a subset of the plurality of SERPs and associated unbiased labels, each of the subset of examples being similar to the digital task within a pre-determined similarity threshold;
  map, the plurality of SERPs into a scale of n-dimensional space based on the associated unbiased labels;
  input, the n-dimensional scale into a second MLA configured to generate one or more clusters, each of the one or more clusters providing maximum benchmark coverage of the n-dimensional scale, each cluster comprising a minimum number of SERP, wherein the second MLA has previously been trained based on a training set, the training set including a pair of digital tasks and a training label indicative of usefulness of a first of the pair of digital tasks as an illustrative example for a second one of the pair of digital tasks;
  associate the subset of examples to the digital task to be presented in the computer-implemented crowd-sourced environment;

cause the digital task to be presented on a computing device of at least one crowd-sourced worker in the computer-implemented crowd-sourced environment to solicit the label for the digital task;
determine a step corresponding to a distance between each of the one or more clusters; and
generate a sliding labelling scale, the sliding labelling scale having label indicators based on the subset of examples, selection of the label being done by the crowd-sourced worker executing an interaction with the label indicator, the interaction of a first type.

\* \* \* \* \*